United States Patent [19]

Clark et al.

[11] 4,393,692
[45] Jul. 19, 1983

[54] STATIC PRESSURE PROBE AND METHOD

[75] Inventors: Walter L. Clark, Scottsdale; Trevor G. Sutton, Tempe, both of Ariz.

[73] Assignee: The Garrett Corporation, Los Angeles, Calif.

[21] Appl. No.: 879,542

[22] Filed: Feb. 21, 1978

[51] Int. Cl.³ .............................................. G01L 7/00
[52] U.S. Cl. ...................................... 73/115; 73/700; 73/861.65
[58] Field of Search ................ 73/212, 189, 182, 700, 73/115, 117.4, 116, 861.65

[56] References Cited
U.S. PATENT DOCUMENTS 1,971,534 8/1934 Peace, Jr. .............................. 73/182
2,809,492 10/1957 Arkawy .......................... 60/39.28 T

*Primary Examiner*—Donald O. Woodiel
*Attorney, Agent, or Firm*—James W. McFarland; Albert J. Miller

[57] ABSTRACT

A static pressure probe capable of measuring the static pressure of an airstream in which particle contamination and/or ice formation at the airflow receiving orifice of the probe is minimized by method and apparatus presenting a stagnant air pocket directly adjacent and downstream of the orifice.

18 Claims, 7 Drawing Figures

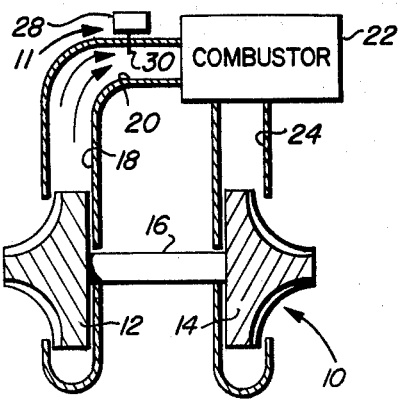
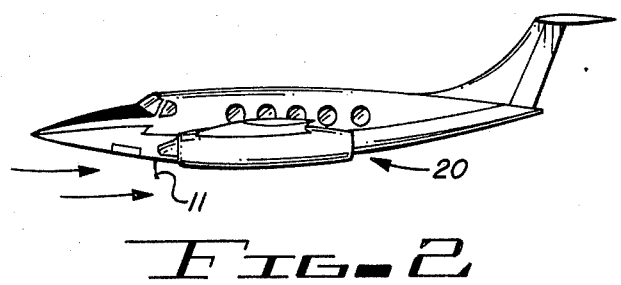
Fig. 1
Fig. 2
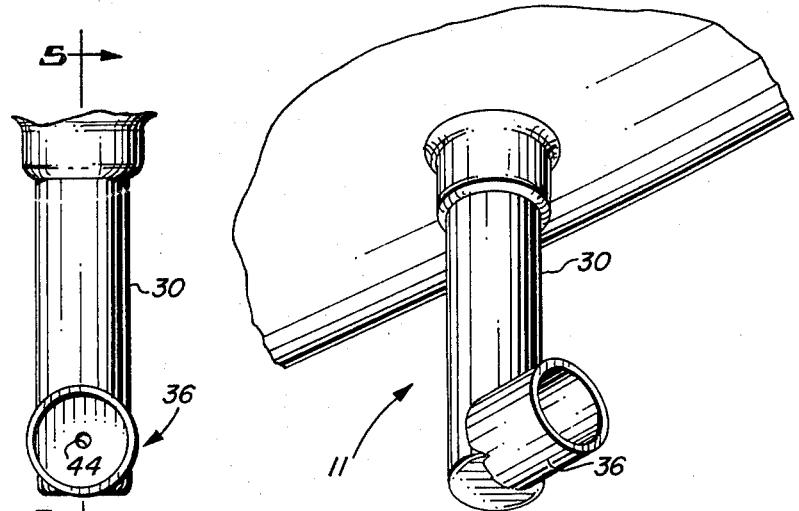
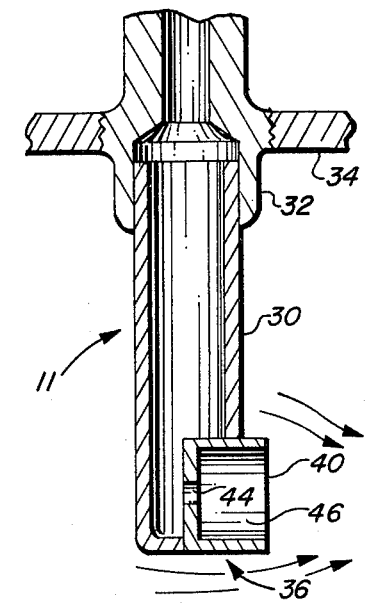
Fig. 3  Fig. 4  Fig. 5
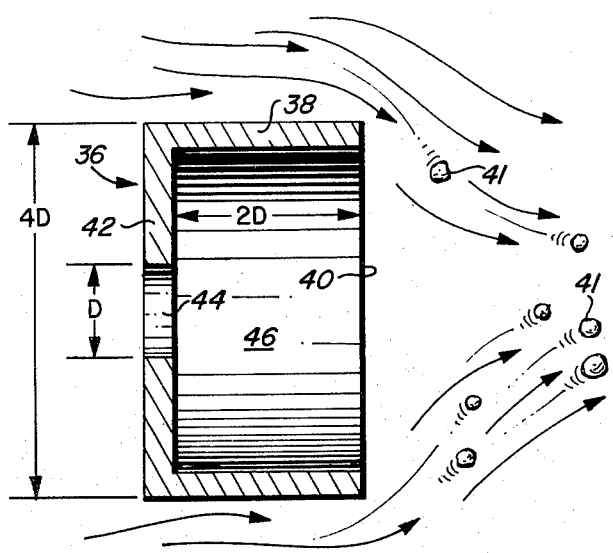
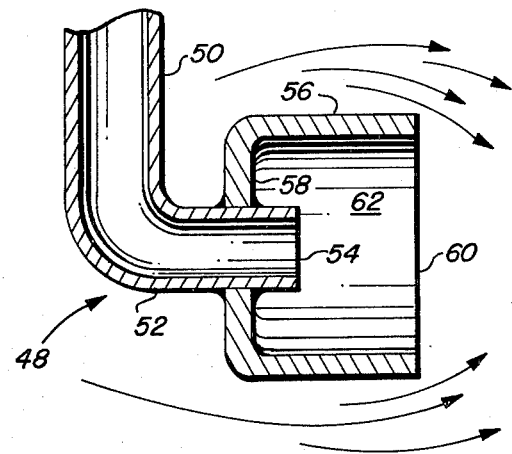
Fig. 6  Fig. 7

4,393,692

STATIC PRESSURE PROBE AND METHOD

BACKGROUND OF THE INVENTION

This invention relates to static pressure probes, and relates more particularly to such type probes which are disposed approximately perpendicularly or more to an airstream, and preferably disposed in the downstream direction of the airstream and which are subject to plugging by particle contamination and/or icing.

Such static pressure probes are utilized in aircraft for measuring ambient static pressure, or in other applications such as in measuring the static pressure of airflow in turbomachinery. In any case various applications of static pressure probes contemplate the utilization of an aperture or orifice for receiving a sample of the airflow whose pressure is being measured, characteristically such orifice facing downstream relative to the airflow. In this manner the static pressure probes are distinguished from venturi or total pressure probes which characteristically have an opening facing upstream into the airflow.

Such pressure probes are utilized for either output reading of the parameter being measured, and/or in control systems for performing various functions, such as in the fuel control system of turbomachinery. It is well known that plugging, either by particle contamination and/or icing, will render such static pressure probe inoperative and deleteriously affect operation of the machinery with which it is associated. In aircraft applications, icing at high altitudes has many times become a critical problem of operation.

Various schemes for avoiding these problems have been considered previously. Generally such schemes center about concepts for passing a heating airflow in the general area of the pickup orifice to prevent icing, and/or utilization of a removable hood which is mounted over the orifice when not in use, and then removed when the pressure probe is in use. Obviously, ducting of heating airflow to a small pressure probe orifice presents several problems of operability, economy, reliability, as well as introducing substantial complexity into an otherwise relatively simple device. It will also be apparent that utilization of a removable hood when the tube is not in use is of no consequence in avoiding particle contamination and/or icing during use of the pressure probe. Exemplary discussions of prior art structures may be found in U.S. Pat. No. 3,535,930 which relates to heating of the probe; U.S. Pat. Nos. 2,488,810; 2,532,316; 2,786,353 all of which relate to removable covers for upstream facing pitot tubes; U.S. Pat. No. 101,858 which relates to an upstream facing pitot-static tube; and U.S. Pat. No. 3,347,095 which is indicative of prior art static pressure probes subject to icing and/or particle contamination.

SUMMARY OF THE INVENTION

Briefly the present invention comprises a generally L-shaped pressure pickup tube member with an airflow receiving orifice which faces in a downstream direction relative to the high velocity airstream passing thereby, or faces in a direction at least approximately ninety degrees to the airstream direction. A protective hood is permanently affixed about the airflow receiving orifice and is configured and arranged to present a static or stagnant air pocket immediately surrounding and adjacent the orifice. The protective hood extends downstream a sufficient distance from the orifice such that airflow from the airstream must make a radical turn and pass through the stagnant air pocket prior to reaching the orifice. Through the sizing, configuration and location of the protective hood, particle contamination and icing at the orifice is avoided without utilizing heating or other secondary airflows. In conjunction with such apparatus the present invention also contemplates an improved method of sampling a high velocity airstream to measure its static pressure in such a manner as to avoid particle contamination and/or icing at the sampling orifice.

Accordingly an important object of the present invention is to provide an improved static pressure probe capable of substantially longer operation in extreme environments without plugging of the sampling orifice either by icing or by particle contamination. A concomitant object is to provide an improved method for sampling the airflow without particle contamination and/or icing of the probe in order to measure the static pressure of the high velocity airstream.

A more particular object of the present invention is to provide such an improved method and apparatus as set forth in the preceding claims for use in conjunction with a pressure sensor to produce a static pressure signal. A yet further object of the present invention is to use such a method and apparatus in turbomachinery in order to accurately and reliably measure the static pressure within a plenum chamber carrying pressurized, relatively high velocity airflow to the combustor of the turbomachine.

These and other more particular objects and advantages of the present invention are specifically set forth in or will become apparent from the following detailed description of preferred forms of the invention when read in conjunction with the accompanying drawing.

BRIEF DESCRIPTION OF THE DRAWING

In the drawing:

FIG. 1 is a schematic, cross-sectional representation of turbomachinery utilizing a static pressure pickup tube as contemplated by the present invention;

FIG. 2 is an elevational view of an aircraft utilizing the present invention;

FIG. 3 is a partial front elevational view of a static pressure probe as contemplated by the present invention;

FIG. 4 is a rear elevational view of the probe of FIG. 3;

FIG. 5 is a cross-sectional elevational view of an enlarged scale taken along lines 5—5 of FIG. 3;

FIG. 6 is an enlarged detailed view of the protective hood of the pressure probe; and FIG. 7 is a partial elevational cross-sectional view of a modified form of the invention.

DETAILED DESCRIPTION OF THE PREFERRED EMBODIMENT

Referring now more particularly to the drawings, FIG. 1 illustrates in schematic form a turbomachine 10 incorporating an improved static pressure probe as contemplated by the present invention generally denoted by the numeral 11. The turbomachine includes a high speed radial airflow compressor 12 driven by a radial inflow turbine 14 through an interconnecting shaft 16. Airflow developed by compressor 12 is collected in duct 18 and delivered to a plenum chamber 20 prior to entering a combustor 22. Conventionally, the airflow is mixed and burned to greatly elevate its temperature in combustor 22 prior to delivery through duct 24 to flow across and drive turbine 14. Useful work from the turbomachine may be extracted from the rotation of shaft 16 through means not illustrated, and/or by the exhaust of high velocity gases from turbine 14. Static pressure probe 11 is disposed in and communicating with plenum chamber 20 to accurately and reliably measure the static pressure of the relatively high velocity airflow passing therethrough to the combustor.

FIG. 2 illustrates another utilization of pressure probe 11 in conjunction with an aircraft 26. In this arrangement the pressure probe 11 is disposed exteriorly of the aircraft and exposed to the high velocity airstream passing the aircraft.

Details of structure of static pressure probe 11 are illustrated in FIGS. 3–6. More particularly, probe 11 includes a generally L-shaped element or member which comprises a downwardly extending hollowed tube 30 arranged generally perpendicular to the airstream to be sampled. As illustrated the upper end of tube 32 may be welded, brazed or otherwise affixed to a fitting 32 which in turn passes through or is threadably secured to extend through the wall 34 of plenum chamber 20. As illustrated in FIG. 1 the upper end of the longer leg of the L-shaped element, i.e. tube 30, communicates with a pressure sensor or other means 28 for sensing the static pressure of the airstream.

Permanently affixed to the lower end of tube 30, such as by welding, is a cylindrical, cup-shaped protective hood 36 which defines a smaller leg of the overall L-shaped tubular element. The smaller leg or protective hood 36 extends generally parallel to the airstream. Tube 36 includes a cylindrical wall 38 having a downstream of distal end 40 which is open to the airstream. At its opposite end the protective hood has a transverse end wall 42 which substantially traverses and closes an open end of the tube 30. Centrally disposed in transverse end wall 42 is an orifice or aperture 44 which is the sampling orifice of the pressure pickup probe and is in communication with the interior of tube 30.

As depicted in FIG. 6 the protective hood 36 is configured and arranged to define an air pocket 46 which contains relatively stagnant air therein due to the small volume and velocity of air flow passing through orifice 44. Preferably, the protective hood is sized such that the distance from orifice 42 in a downstream direction to open end 40 is at least the length of the diameter "D" of orifice 44, and preferably is approximately of a length 2D. The diameter of cylindrical wall 38 and more particularly of opening 40 is at least twice the orifice diameter and preferably approximately 4D.

In operation, it will be apparent from FIG. 6 that the airstream passing about protective hood 36 must undergo a significant change in velocity when passing across open end 40 when attempting to enter relatively stagnant air pocket 46. In this respect it is noted that the volume and thus velocity of airflow passing through orifice 44 and tube 30 to pressure sensor 28 is relatively low since only static pressure is being measured. Yet immediately downstream of and adjacent opening 40 a higher velocity airstream still exists. Accordingly the higher velocity airstream carries solid particles such as illustrated by elements 41 in FIG. 6 on past protective hood 36. Any particles turning about the corner presented at opening 40 are immediately subject to a rapid deceleration, and tend to fall back in and be carried by the high velocity airstream flowing past the protective hood.

As can best be understood, the relative arrangement of hood 36 which presents the opening 40 at a distance downstream from orifice 44 at least equal to the diameter of orifice 44, and the relatively large size of opening 40 compared to orifice 44, precludes the particle contamination and/or icing or orifice 44. Apparently, the solid particles, being of much greater density tend to be carried on past opening 40 in the manner discussed above. Specifically, it appears that the stagnant, relatively low velocity air pocket 46 prevents entry of the solid particles very far into pocket 46, and thus precludes the entry into orifice 44. Similarly, as can best be understood and theorized, it appears that the rapid change in velocity occurring at the outer edge of opening 40 assures that crystallization of any moisture in the airstream into ice particles will occur at this point of rapid velocity change. Thus the heavy density ice particles tend to form around the outer edge of opening 40 rather than at orifice 44 and tend to be carried on with the airstream along with other solid particles.

In any case, it has been found in practical application that utilization of the protective hood 36 which presents the opening 40 downstream of orifice 44 effectively precludes icing on orifice 44 and minimizes particle ingestion thereby. Thus the present invention accomplishes anti-icing and minimizes particle ingestion by the air sampling orifice through a fixed geometry, very economical, simple structure without utilizing secondary heating airflow and/or removable protective hoods and the like.

Another example of the present invention is illustrated in FIG. 7 wherein a pickup tube 48 has a longer vertical leg 50 extending generally perpendicularly to the airstream, and a shorter leg 52 extending generally parallel to the airstream and terminating in a pickup orifice or aperture 54. A protective hood 56 of cylindrical, cup-shaped configuration surrounds orifice 54 and has a closed transverse end wall 58 welded or otherwise permanently affixed to leg 52 at a location upstream of orifice 54. A downstream open end 60 of hood 56 is disposed a substantial distance downstream of orifice 54. Thus hood 56 presents an internal stagnant air pocket 52 separating orifice 54 from the surrounding high velocity airstream. The relative dimension, sizes and location of opening 60 relative to the diameter of orifice 54 is preferably the order of dimensions set forth previously with respect to the FIG. 6 embodiment.

From the foregoing it will therefore be apparent that the present invention provides an improved method of sensing static pressure in the airstream which comprises sampling the airstream by receiving airflow through an orifice which faces downstream relative to the airflow; constraining airflow to pass downstream completely past the orifice a distance at least equal to the diameter of the orifice; gathering the airflow to be sampled in a relatively static or stagnant air pocket of a diameter of at least twice the size of the orifice after the constraining step and prior to permitting the airflow to enter the orifice. The sample of airflow thus received is then transmitted to the pressure sensor 28 or the like for pressure measurement. Further, it will be apparent that the present invention provides an improved method for preventing plugging by solids ingestion and/or formation of ice at the sensing port of a static probe which includes the step of constraining airflow to flow past the sensing port a distance at least equal to the diameter of the port 44 or 54; then gathering airflow to be sampled in the air stagnant pocket 46 or 62; and finally permitting only airflow from the stagnant pocket to enter and pass through the sensing port or orifice.

Various alterations and modifications to the embodiments specifically illustrated and described above will be apparent to those skilled in the art. For instance, the pickup orifice may face in a non-upstream direction such as at right angles to the airflow and still obtain the benefits of the present invention. Accordingly, the foregoing detailed description should be considered exemplary in nature and not as limiting to the scope and spirit of the invention as set forth in the appended claims.

Having described the invention with sufficient clarity that those skilled in the art may make and use it, we claim:

1. A probe for use in measuring static pressure of an airstream comprising:
   a flow pickup tube having an open end disposed in a downstream direction relative to said airstream, said open end presenting an orifice of preselected size; and
   a protective hood carried with said tube in surrounding relationship to said open end of the tube, said hood being substantially larger than said tube and having an open distal end disposed downstream of said orifice and presenting an opening communicating with said airstream, said opening being at least twice as large as said orifice.

2. A probe as set forth in claim 1, wherein said hood defines an air stagnant pocket between said orifice and said opening, said pocket configured and arranged to minimize ingestion by said orifice of particles capable of plugging said orifice and to minimize formation of ice at said orifice.

3. A probe as set forth in claim 2, wherein said hood is of cylindrical configuration terminating in said open distal end and having a transverse end wall at its other end substantially closing said open end of the tube, said orifice comprising a centrally located aperture in said transverse end wall.

4. A probe as set forth in claim 3, wherein said orifice is circular and has a preselected diameter, the diameter of said stagnant pocket and said opening being at least twice said preselected orifice diameter.

5. A probe as set forth in claim 4, wherein said stagnant pocket extends downstream of said orifice a distance at least as great as said preselected orifice diameter.

6. A probe as set forth in claim 2, wherein said tube and said hood comprise a unitary element of L-shaped configuration, said hood presenting a smaller leg of said element extending generally parallel to said airstream.

7. A probe as set forth in claim 6, wherein said tube presents a longer leg of said element extending generally perpendicular to said airstream.

8. A probe as set forth in claim 7, further including means for measuring said static pressure operably communicating with said longer leg.

9. In a gas turbine engine having a compressor delivering a pressurized airstream to a plenum chamber for subsequent delivery to a combustion chamber and then exhaust across a turbine to drive said turbine, a probe for measuring static pressure in said plenum chamber, comprising:
   a flow pick up tube having an orifice disposed in said plenum chamber facing in a downstream direction relative to the airstream therein; and
   a protective hood carried with said tube surrounding said orifice and having an open distal end disposed downstream of said orifice, said open distal end being substantially larger than said orifice and having a relatively large unrestricted opening communicating with said airstream, said opening of the distal end being substantially larger than said orifice.

10. In a gas turbine engine as set forth in claim 9, wherein said hood is arranged and configured to define an air stagnant pocket between said orifice and said open distal end for minimizing ingestion by said orifice of particles capable of plugging said orifice and for minimizing formation of ice at said orifice.

11. In a gas turbine engine as set forth in claim 10, wherein said hood is of cylindrical configuration terminating in said open distal end and having a transverse end wall at its other end substantially closing said open end of the tube, said orifice comprising a centrally located aperture in said transverse end wall.

12. In a gas turbine engine as set forth in claim 11, wherein said orifice is circular and has a preselected diameter, the diameter of said stagnant pocket and said opening of the distal end of the hood being at least twice said preselected orifice diameter.

13. In a gas turbine engine as set forth in claim 12, wherein said stagnant pocket extends downstream of said orifice a distance at least as great as said preselected orifice diameter.

14. In a gas turbine engine as set forth in claim 10, wherein said tube and said hood comprise a unitary element of L-shaped configuration, said hood presenting a smaller leg of said element extending generally parallel to said airstream.

15. In a gas turbine engine as set forth in claim 14, wherein said tube presents a longer leg of said element extending generally perpendicular to said airstream and secured to and passing the wall of said plenum chamber.

16. In a gas turbine engine as set forth in claim 15, further including means for measuring said static pressure, said means disposed exteriorly of said plenum chamber and operably communicating with said longer leg.

17. A static probe for measuring static pressure of an airstream comprising:
   a pickup tube having an open distal end presenting a substantially circular opening facing in a direction at least approximately ninety degrees to the direction of said airstream, said opening being sufficiently large to prevent plugging thereof by ice formation; and
   means recessed in said tube upstream of said open distal end for defining an orifice for receiving airflow from said airstream, said orifice having a diameter less than one-half the diameter of said opening.

18. A probe for sensing static pressure of an airstream comprising:
   a hollow tubular member of generally L-shaped configuration having a smaller leg disposed generally parallel to said airstream, said smaller leg having a circular orifice at an end thereof facing downstream relative to said airstream, said orifice transmitting airflow from said airstream to said hollowed tubular member, said member having a longer leg extending generally transversely to said airstream;

means communicating with said longer leg of said tubular member for measuring the pressure of airflow received therein; and said smaller leg including a cup-shaped, cylindrical hood secured to said longer leg and having a transverse end wall at an upstream end having an aperture therein defining said orifice, said hood further including a closed cylindrical wall extending downstream from said transverse end wall to terminate at a downstream end disposed downstream of said circular orifice, said cylindrical wall having a diameter substantially greater than said orifice and disposed in concentric surrounding relationship thereto, said downstream end of said cylindrical wall being open to present a circular opening facing downstream and communicating with said airstream whereby airflow from said airstream enters said opening and passes upstream within the interior of said hood prior to entering said orifice, said hood operable to minimize ingestion of particles capable of plugging said orifice, said opening being substantially larger than said orifice to prevent plugging of said opening by ice formation and to minimize formation of ice at said orifice.

* * * * *